United States Patent [19]
Redey

[11] Patent Number: 5,720,615
[45] Date of Patent: Feb. 24, 1998

[54] EDUCATIONAL DEVICE FOR AIDING IN THE PROJECTION OF VIEWS OF AN OBJECT

[76] Inventor: George Redey, 185 W. Demarest Ave., Englewood, N.J. 07631

[21] Appl. No.: 716,990

[22] Filed: Sep. 20, 1996

[51] Int. Cl.$^6$ ............................................. G09B 11/00
[52] U.S. Cl. ............................................. 434/92; 434/208
[58] Field of Search ............................ 434/91, 92, 195, 434/196, 205, 208, 85

[56] References Cited

U.S. PATENT DOCUMENTS

| | | | |
|---|---|---|---|
| 2,319,162 | 5/1943 | Short | 434/92 |
| 2,977,688 | 4/1961 | Redey | 434/92 |
| 3,055,120 | 9/1962 | Scott | 434/92 |
| 3,229,388 | 1/1966 | Smith | 434/195 |
| 5,098,301 | 3/1992 | Woods | 434/208 |
| 5,492,472 | 2/1996 | Suarez | 434/92 |

FOREIGN PATENT DOCUMENTS

| | | | |
|---|---|---|---|
| 234759 | 5/1969 | U.S.S.R. | 434/92 |
| 673326 | 6/1952 | United Kingdom | 434/92 |

OTHER PUBLICATIONS

Thomas E. French, M.E., A Manual of Engineering Drawing for Students and Draftsmen, pp. 76–79.

*Primary Examiner*—Paul J. Hirsch
*Attorney, Agent, or Firm*—Spencer & Frank

[57] ABSTRACT

An educational device for aiding in the projection of views of an object. The device includes a first half-hexahedron composed of a bottom panel, a first vertical panel and a second vertical panel. The panels are perpendicular to one another and together define a corner space for accommodating an arbitrarily configured object supportable on the bottom panel. There is further provided a second half-hexahedron composed of a transparent top panel, a transparent third vertical panel and a transparent fourth vertical panel. The panels of the second half-hexahedron are perpendicular to one another and together define a corner space. The second half-hexahedron is removably positionable on the first half-hexahedron such that the first and the second half-hexahedrons form a complete hexahedron. Grid markings are provided on the three panels of the first half-hexahedron and on the three panels of the second half-hexahedron. The grid markings divide the panels into rectangular elements alignable with the object along imaginary orthogonal projection lines for imaginarily forming projected views of the object on the three panels of the first half-hexahedron and on the three transparent panels of the second half-hexahedron.

11 Claims, 5 Drawing Sheets

EDUCATIONAL DEVICE FOR AIDING IN THE PROJECTION OF VIEWS OF AN OBJECT

BACKGROUND OF THE INVENTION

This invention relates to an educational device and concerns, more particularly, an aid for generating orthogonally projected views of objects.

Engineering and architectural objects are conventionally represented in three orthogonally projected views: a front elevational view, a side elevational view and a top plan view. Conventionally, the object is imaginarily positioned in a corner space formed by three intersecting, mutually perpendicular planes which may be considered as three mutually intersecting sides (panels) of a hexahedron, such as a cube. The views of the object are generated by forming the outline (shadow) of the object on the three planes by an orthogonal projection from the front, a side and the top. Thereafter two of the planes are pivoted to assume a coplanar, side-by-side relationship with the third plane. As a result, the three views appear in a single plane, next to each other in a grouping set by engineering and architectural convention.

Two systems have become the standard to generate the three views of an object by orthogonal projection.

According to a first system, referred to hereafter as the European method, the object is situated between the plane where the view is reproduced by the parallel projection lines and the observer whose line of sight is assumed to be in alignment and codirectional with the parallel projection lines. Stated differently, the plane is situated behind the object as viewed by the observer. Thus, according to the European method, the object is placed on the horizontal bottom plane of the corner space and the observer is positioned in front of the object. One vertical plane forming the corner is at the left of the observer, while the other vertical plane is in the rear, behind the object. It follows therefore that the front elevational view is reproduced on the rear plane, the side elevational view is generated on the left plane, while the top plan view appears on the horizontal bottom plane. Thereafter, as dictated by convention, the left plane is rotated leftward, about its edge of intersection with the rear plane, to assume a coplanar, side-by-side relationship with the rear plane, to the left thereof. Likewise, the horizontal (bottom) plane is rotated downward, about its edge of intersection with the rear plane, to assume a coplanar, side-by-side relationship underneath the rear plane. The three views consequently appear in a triangular grouping where the side elevational view is to the left of the front elevational view and the top plan view is below the front elevational view.

According to a second system, referred to hereafter as the British or North American method, the plane where the view is reproduced by the parallel projection lines is situated between the object and the observer whose line of sight is assumed to be aligned with, but looking into the parallel projection lines. Stated differently, the plane is situated in front of the object as viewed by the observer. The plane is assumed to be transparent, since the observer views the object through the plane. Thus, according to the North American method, the object is underneath the horizontal top plane of the corner space of the hexahedron and the observer is positioned in front of the object. One vertical plane forming the corner space of the hexahedron is at the right of the observer, while the other vertical plane is in front of the object. It follows therefore that the front elevational view is reproduced on the transparent front plane, the side elevational view is generated on the transparent right plane, while the top plan view appears on the transparent horizontal top plane. Thereafter, as dictated by convention, the right plane is rotated toward the observer about its edge of intersection with the front plane, to assume a coplanar, side-by-side relationship with the front plane, to the right thereof. Likewise, the horizontal top plane is rotated upward, about its edge of intersection with the front plane, to assume a coplanar, side-by-side relationship above the front plane. The three views consequently appear in a triangular grouping where the side elevational view is to the right of the front elevational view and the top plan view is above the front elevational view.

The two methods thus yield identical views which, however, are differently arranged relative to one another.

U.S. Pat. No. 2,977,688 issued Apr. 4, 1961 discloses a device for a three-dimensional demonstration of the European method and for acquiring the skill for its practice. In use, the device constitutes a half-cube composed of three mutually perpendicular walls, each provided with a grid marking, dividing the wall surface into a series of squares. An arbitrary structure is built on the horizontal bottom wall from building blocks whose sides are equal to or are multiples of the sides of the grid squares. The user visually determines the three views of the structure by the European method as they would appear projected on the three walls behind the object as the user observes the object from the front, from the right side and from the top. The visual determination is aided by the grid markings. A booklet containing various problems and their solution drawn on a grid corresponding to the grid markings on the three walls enhances the learning process.

In view of the ever increasing international interaction in all fields of human endeavor, an ability and skill of interchangeably using the European and North American methods of projection is a pronounced, positive asset.

SUMMARY OF THE INVENTION

It is an object of the invention to provide an improved educational device of the above-outlined type with which the European and the North American methods can be simultaneously practiced to thus give the user the opportunity to immediately compare the two systems and to develop in a parallel fashion the dual skills of constructing views according to both the North American and the European method. Further, the educational device may also be used as an implement for conducting aptitude tests.

These objects and others to become apparent as the specification progresses, are accomplished by the invention, according to which, briefly stated, the educational device includes a first half-hexahedron composed of a bottom panel, a first vertical panel and a second vertical panel. The panels are perpendicular to one another and together define a corner space for accommodating an arbitrarily configured object supportable on the bottom panel. There is further provided a second half-hexahedron composed of a transparent top panel, a transparent third vertical panel and a transparent fourth vertical panel. The panels of the second half-hexahedron are perpendicular to one another and together define a corner space. The second half-hexahedron is removably positionable on the first half-hexahedron such that the first and the second half-hexahedrons form a complete hexahedron. Grid markings are provided on the three panels of the first half-hexahedron and on the three panels of the second half-hexahedron. The grid markings divide the panels into rectangular elements alignable with the object along imaginary orthogonal projection lines for imaginarily forming projected views of the object on the three panels of the first half-hexahedron and on the three transparent panels of the second half-hexahedron.

DESCRIPTION OF THE PREFERRED EMBODIMENTS

Figure 1:
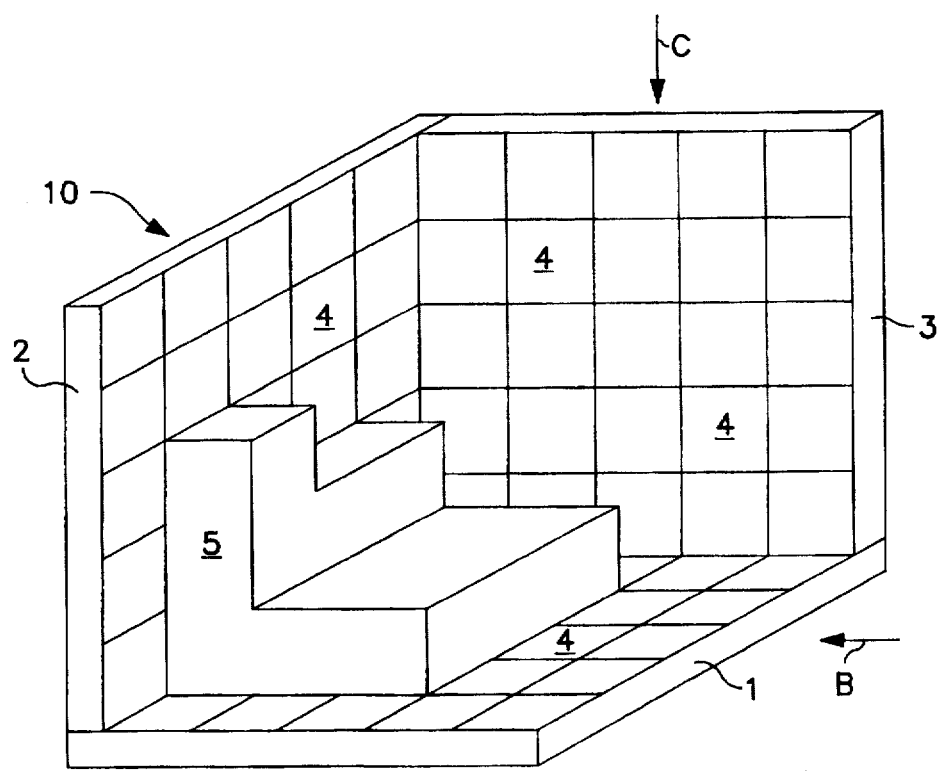
FIG. 1 is a perspective view of one part of a first preferred embodiment of the invention.

FIG. 1 shows a three-sided structure or half-cube generally designated at 10 having mutually perpendicular sides or panels 1, 2 and 3. The three sides or panels are secured to one another (for example, by gluing) at their mutual, adjoining edges.

All three sides 1, 2 and 3 are, on their surfaces oriented towards the space defined by the half-cube 10, provided with two sets of parallel lines, wherein the lines of one set are perpendicular to the lines of the other set so that a grid pattern having square elements 4 is formed. The panels 1, 2 and 3 are preferably opaque and may be made, for example, of wood.

The half-cube 10 serves to demonstrate and practice the European method of view projection of a body in a manner as follows:

An object 5, such as a geometrical body is placed on the panel 1, for example, such that it is backed up against the side panel 2. The object 5 may be a one-piece member or may be built, in building block fashion, from hexahedral elements. Some of these elements may be, for example, cubes having a side equal to one side of a square 4. Other such hexahedral elements may be, for example, a body having the height of one side of a square 4 and opposite large surfaces each having a narrower side twice the size of a square side and a longer side which is three times the size of a side of the square 4. Providing such hexahedral elements (building blocks) is advantageous because the object built on the bottom panel 1 may have a great variety of configurations.

As a next step, the object 5 in the half-cube 10 is viewed, for example, in the direction of the arrow A. The observer's line of vision is assumed to extend perpendicularly to the rear panel 3 and thus the outline of the object 5 will be imaginarily projected thereon, creating the imaginary front elevational view of the object. Since the object 5 is positioned on the bottom panel 1 such that its boundaries are in alignment with the grid lines thereon, the imaginary projection lines will all intersect the grid lines on the rear panel 3 and thus the front elevational view will be composed by a pattern put together by the sides of the various squares 4. Thus, the grid assists the observer in constructing the view and also assists the observer in drawing, for example, on a separate piece of graph paper, the outline of the view as seen in the direction A. After having constructed the front elevational view, the observer views the object 5 from the direction of arrow B to similarly construct a side elevational view projected onto the vertical panel 2 and thereafter he views the object 5 in the direction of the arrow C to construct a top plan view of the object 5, projected on the bottom panel 1.

The observed views sketched out by the student should be grouped as required by convention. For this purpose, the bottom panel 1 is imaginarily rotated downwardly as if it were hinged along the lower horizontal edge of the panel 3 and the panel 2 is imaginarily rotated leftward as if it were hinged along the left vertical edge of the panel 3. Thus, all three panels 1, 2 and 3 lie imaginarily in a single plane and, as a result, the side elevational view (projected onto panel 2) will appear to the left of the front elevational view (projected onto panel 3) and the top plan view (projected onto the bottom panel 1) will appear below the front elevational view.

The student's work can thereafter be compared with a booklet containing solutions to various problems.

For constructing the views according to the North American method, the half-cube 10, with the geometrical body 5 thereon are left to remain in place.

Figure 2:
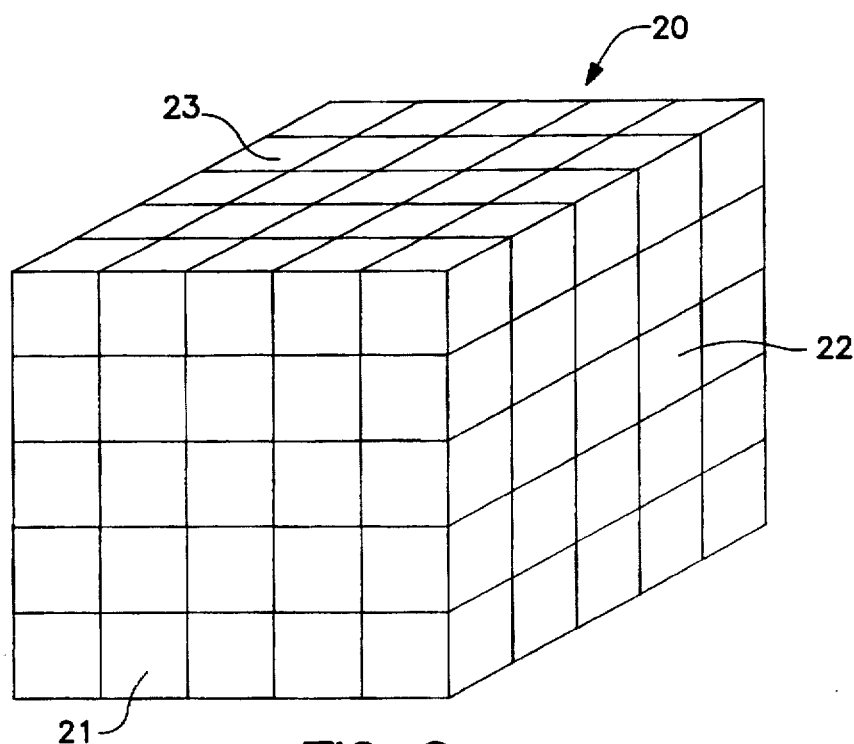
FIG. 2 is a perspective view of another part of the first preferred embodiment of the invention.

Turning to FIG. 2, a second half-cube generally designated at 20 structured identically to the half-cube 10 of FIG. 1 is provided. The half-cube 20 has three transparent, mutually perpendicular sides or panels 21, 22 and 23 which may be affixed (glued) to the one another to form a rigid, one-piece component.

Similarly to the panels 1, 2 and 3 of the half-cube 10, the panels 21, 22 and 23 of the half-cube 20 are provided with grid patterns dimensioned identically to the grid patterns on the panels of the half-cube 10.

Figure 3:
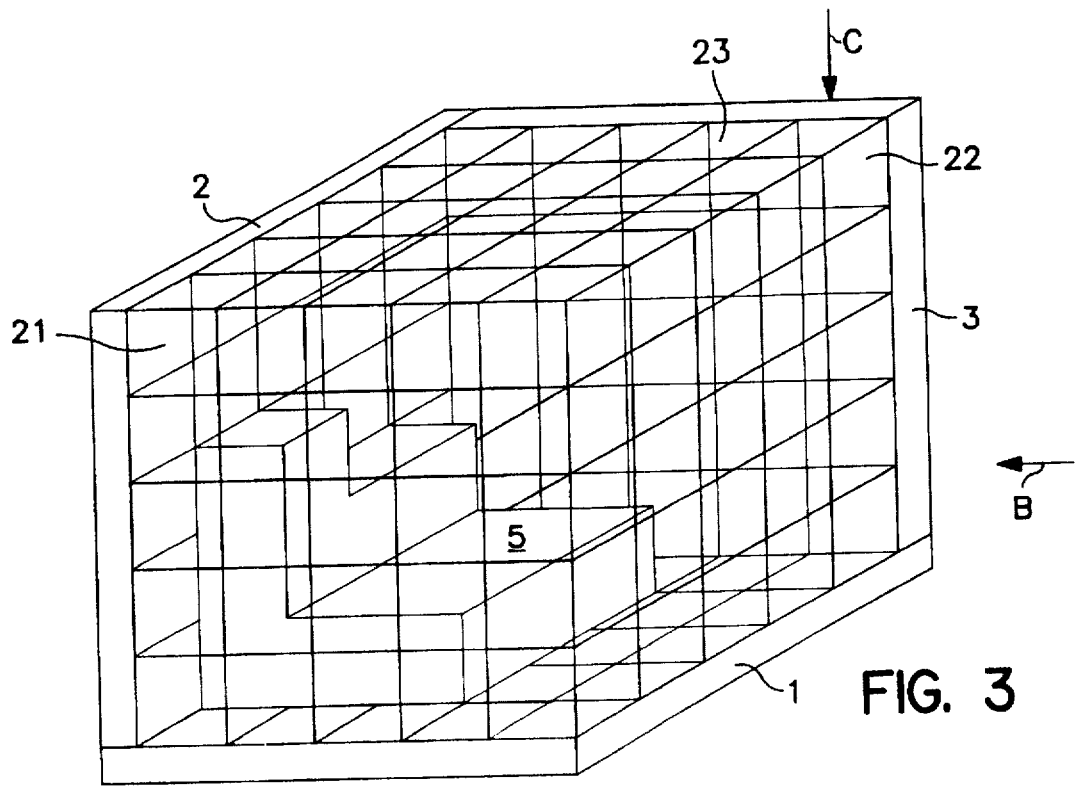
FIG. 3 is a perspective view of the two parts of FIGS. 1 and 2, forming an entire cube.

The half-cube 20 is positioned in contact with the half-cube 10 such that a complete cube is formed, closed by the six panels on all sides as shown in FIG. 3. The object 5 positioned on the panel 1 of the half-cube 10 is clearly visible from the outside through the transparent panels 21, 22 and 23.

The construction of the front elevational, side elevational and top plan views according to the North American method with the aid of the half-cube 20 positioned on the half-cube 10 is again performed by observing the object in the directions A, B and C, respectively.

Thus, to construct the front elevational view, the observer views the object in the direction A through the transparent panel 21 which is thus situated between the object 5 and the observer. The projection lines are assumed to extend from the object through the panel 21 towards the observer and thus these projection lines outline the front elevational view of the object on the inside of the panel 21, also visible from the exterior.

As in the earlier-described European method, the observer now may draw the imaginary projection on a separate piece of paper, aided by the grid provided on the panel 21.

In the same manner, the object is viewed through the transparent panel 22 in the direction B to obtain a side elevational view of the object 5 on the panel 22 and through the transparent panel 23 in the direction C to obtain a top plan view on the panel 23.

The observed views sketched out by the student should be grouped as required by convention. For this purpose, the panels 22 and 23 are rotated into the plane of the panel 21 and, consequently, the top plan view will be situated above and the side elevational view will be situated to the right of the front elevational view. Again, the result can be compared with a booklet containing the solution for the particular body used. The observer student will thus see that the views according to the European method are the same as those obtained by the North American method; merely the relative arrangement of the views is different. Thus, the student is able to practice, with the same device and in succession, the European and North American methods enabling the student to simultaneously develop skills for both methods and allowing the student to make a comparison between the two.

According to the first embodiment illustrated in FIGS. 1, 2 and 3, the cube formed of the non-transparent half-cube 10 and the transparent half-cube 20 is a two-piece structure. The one-piece half-cube 10 formed of non-transparent panels may be, for example, placed on a table such that the panel 1 rests on the tabletop, thereafter the object 5 is positioned on the panel 1 and, after the European projecting method has been completed, the other one-piece half-cube 20 having transparent panels is placed, like a cover, against the half-cube 10 to complement the structure to a full cube for performing the North American method.

According to the embodiment to be described in connection with FIGS. 4–11, the cube may be entirely disassembled to its six panels. In the assembled state, the easily releasable connections ensure a sufficiently mutually rigid connection to provide a stable cubical structure.

Figure 4:
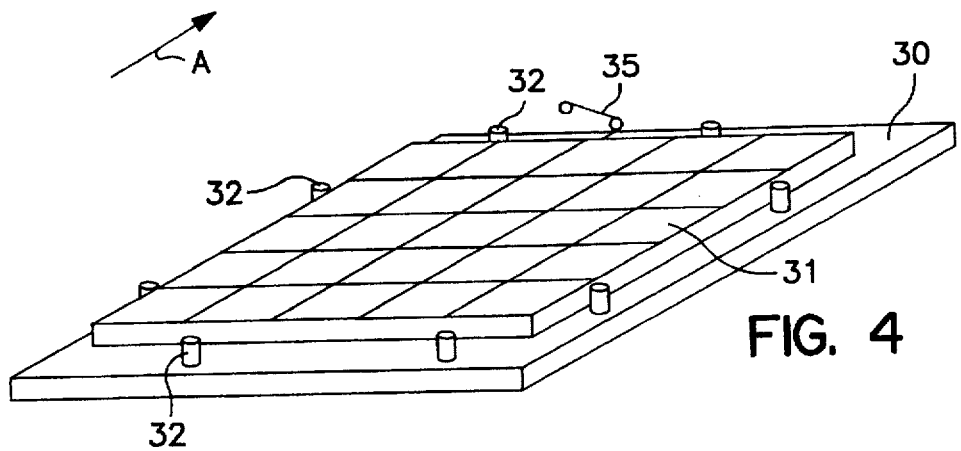
FIG. 4 is a perspective view of a first disassembled part of a second preferred embodiment of the invention.
Figure 5:
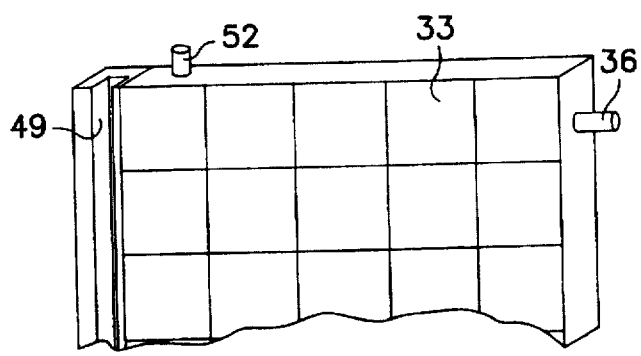
FIG. 5 is a perspective view of a second disassembled part of the second embodiment.
Figure 6:
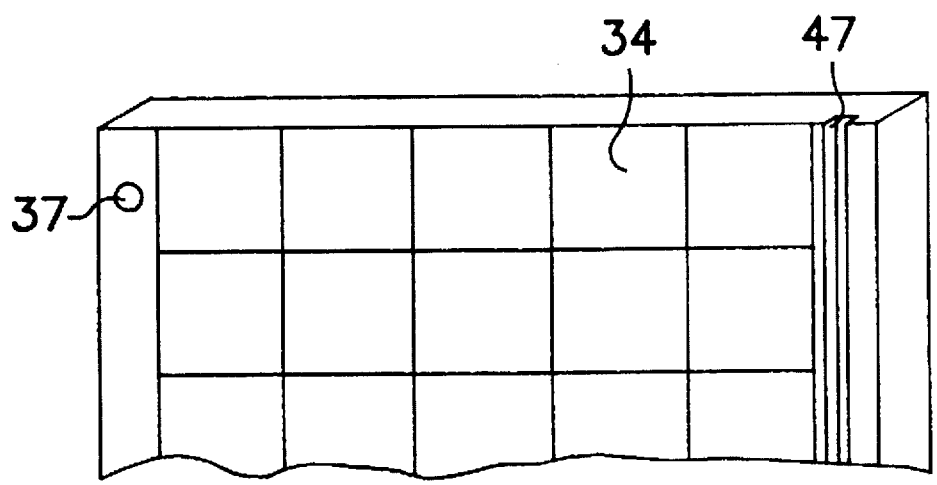
FIG. 6 is a perspective view of a third disassembled part of the second embodiment.
Figure 10:
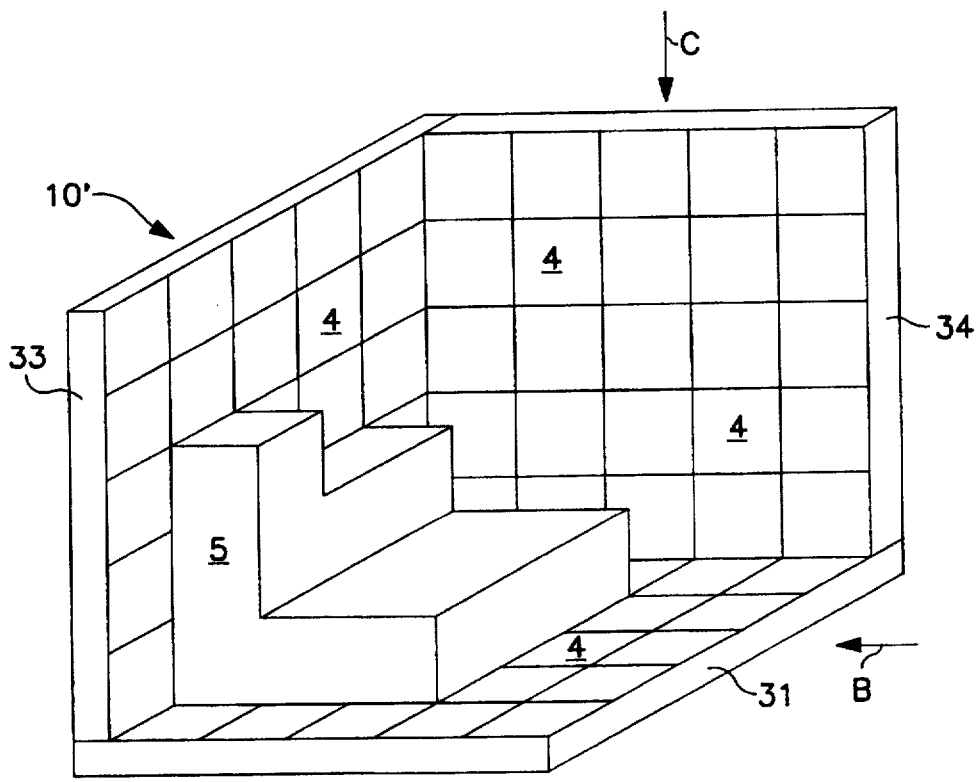
FIG. 10 is a schematic perspective view of the assembled first, second and third parts of the second embodiment.

Turning to the schematic FIG. 10, the half-cube generally designated at 10' (and corresponding to the half-cube 10 of FIG. 1) has a square bottom panel 31 mounted (for example, glued) on the top face of a square base 30, as illustrated in FIG. 4. The bottom panel 31 constitutes one side of the half-cube 10' and therefore, similarly to the panel 1 of the half-cube 10, it is provided with a grid marking. As also shown in FIG. 4, on the top face of the base 30, along its four edges, upstanding supporting pins 32 are provided which, in cooperation with respective four edges of the panel 31, position and hold the four vertical panels of the complete cube, as will be described below. The set of pins 32 along two adjoining edge portions of the top face of the base 30 and the respective adjacent edges of the panel 31 constitute channels for receiving and supporting a vertical panel 33 also shown in FIG. 5 and a vertical panel 34 also shown in FIG. 6. In their function, the panels 33 and 34 which are also provided with grid markings, correspond to the panels 2 and 3 of the half-cube 10 of FIG. 1. For improving the stability of the three-sided structure formed of the three disassemblable components 30, 33 and 34, a C-spring 35 (FIG. 4) is secured to the base 30, approximately at the middle along one edge thereof, to exert a resilient inward force on the panel 33 when the panels 33 and 34 are in place on the top face of the base 30. For further enhancing stability, the panel 33 (FIG. 5).may have a dowel 36 projecting into an aligned hole 37 provided along an edge of the panel 34 (FIG. 6).

The above-described construction ensures that in the assembled state of the base 30 (on which the panel 31 is permanently mounted), the panel 33 and the panel 34, a sufficiently stable and rigid half-cube 10' of FIG. 10 is obtained.

Figure 11:
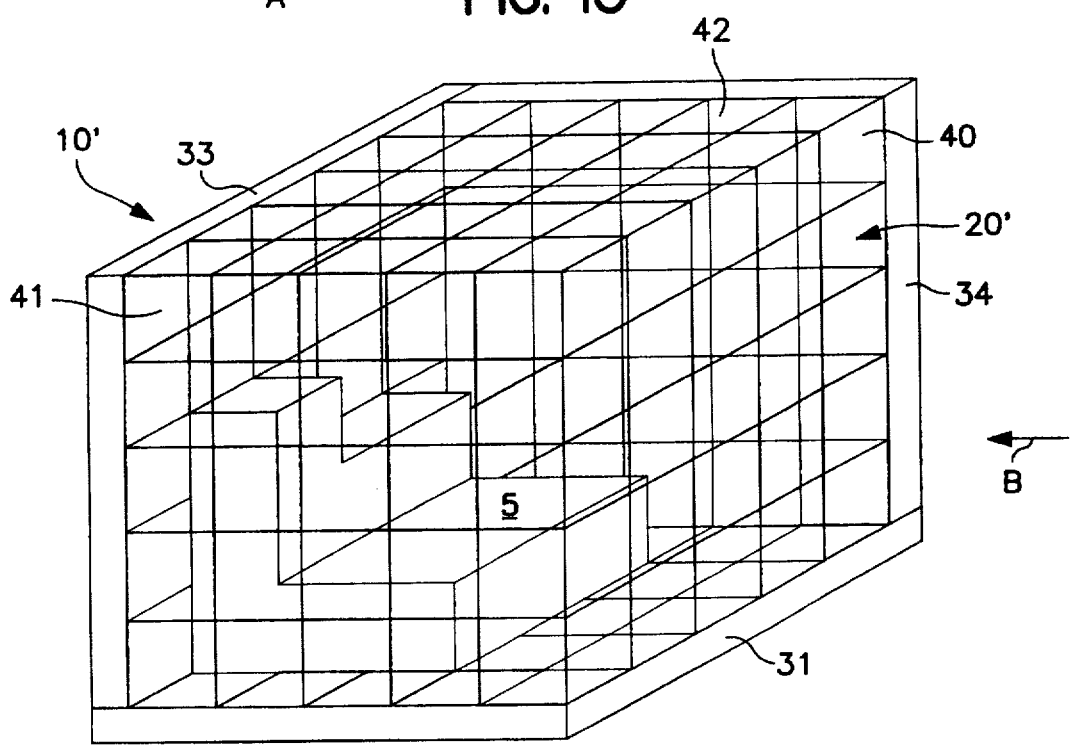
FIG. 11 is a schematic perspective view of the assembled six parts of the second embodiment.

Turning to the schematic FIG. 11, the half-cube 20' to be used with the half-cube 10' shown in FIG. 10 corresponds in function to the half-cube 20 of the first embodiment and is composed of transparent panels 40, 41 and 42 which, similarly to the panels 21, 22 and 23 of the half-cube 20, carry a grid marking, composed of squares. The panels 40, 41 and 42 are, along respective edges, releasably coupled to one another and also to respective panels 31, 33 and 34 in a manner now to be described in conjunction with FIGS. 7, 8 and 9. It is noted that the releasable coupling mechanisms between panels are not shown in FIGS. 10 and 11 for the sake of clarity.

Figure 7:
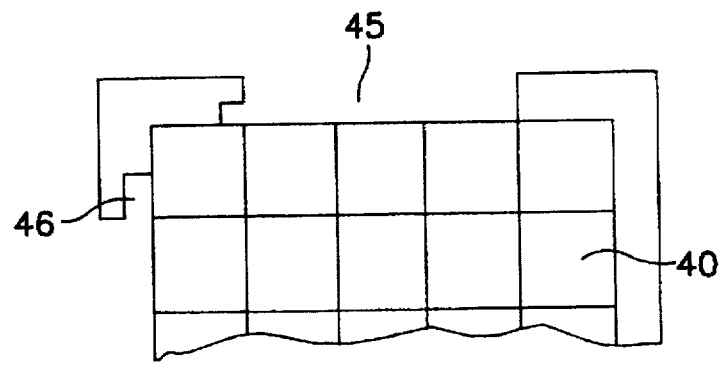
FIG. 7 is a plan view of a fourth disassembled part of the second embodiment.

FIG. 7 shows the transparent vertical panel 40 which has an elongated cutout 45 along its top edge and a cutout 46 along a vertical edge. The vertical edge of the panel 40 opposite the cutout 46 fits into a vertical groove 47 provided along the inner face of the panel 34 shown in FIG. 6. The horizontal edge portion (not shown in FIG. 7) of the panel 40 opposite cutout 45 is received by the channel formed of one edge of the panel 31 and one set of pins 32 provided along an edge of the base 30.

Figure 8:
FIG. 8 is a plan view of a fifth disassembled part of the second embodiment.

As shown in FIG. 8, the transparent vertical panel 41 has in an upper corner region a notch 48 which fits into the cutout 46 of the panel 40 (FIG. 7) while the lower horizontal edge (not shown in FIG. 8) of the panel 41 is received in the channel formed of a set of pins 32 and one side of the panel 31. The vertical edge of the panel 41 remote from the cutout 48 fits into a vertical groove 49 provided along the inner face of the panel 33 shown in FIG. 5.

Figure 9:
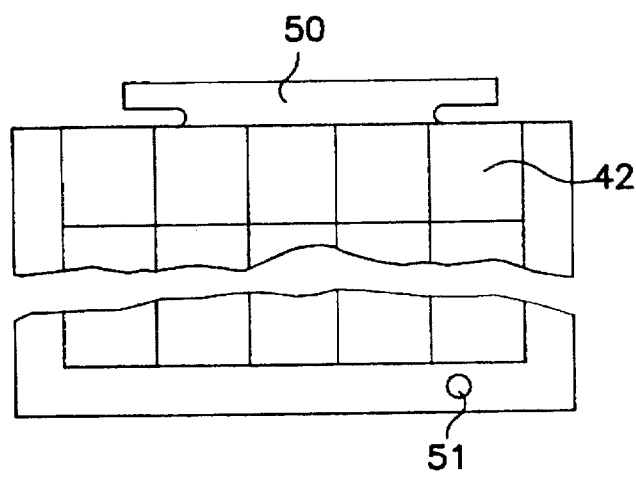
FIG. 9 is a plan view of a sixth disassembled part of the second embodiment.

As shown in FIG. 9, the transparent horizontal panel 42 has, along one edge, an elongated T-shaped projection 50 which fits into the cutout 45 of the panel 40 (FIG. 7) as the panel 42 is positioned horizontally on the top edges of the two vertical panels 33 and 34. For an improved positioning of the horizontal panel 42, the latter has, adjacent a corner, a hole 51 receiving an upstanding dowel 52 on the upper horizontal edge of the panel 33 as shown in FIG. 5.

Thus, in use, first the non-transparent panels 31, 33 and 34 are assembled into the half-cube 10' as shown in FIG. 10 and thereafter, as in the earlier described embodiment shown in FIG. 1, an object 5 is positioned on the bottom panel 31 for first practicing the European method. Then, leaving the object 5 in place, the panels 40, 41 and 42 are inserted and interconnected to form the entire cube as illustrated in FIG. 11 for performing the projection of the object 5 onto the transparent walls of the panels 40, 41 and 42 according to the North American method.

It will be understood that the above description of the present invention is susceptible to various modifications, changes and adaptations, and the same are intended to be comprehended within the meaning and range of equivalents of the appended claims.

What is claimed is:

1. An educational device for aiding in the projection of views of an object, comprising
    (a) a first half-hexahedron composed of a bottom panel, a first vertical panel and a second vertical panel; said panels being perpendicular to one another and together defining a first corner space for accommodating an arbitrarily configured object supportable on said bottom panel;
    (b) a second half-hexahedron composed of a transparent top panel, a transparent third vertical panel and a transparent fourth vertical panel; said panels of said second half-hexahedron being perpendicular to one another and together defining a second corner space;

said second half-hexahedron being removably positionable on said first half-hexahedron such that said first and said second half-hexahedrons form a complete hexahedron; and (c) grid markings provided on the three panels of said first half-hexahedron and on the three panels of said second half-hexahedron; said grid markings dividing said panels into rectangular elements alignable with the object along imaginary orthogonal projection lines for imaginarily forming projected views of the object on the three panels of said first half-hexahedron and on the three transparent panels of said second half-hexahedron.

2. The educational device as defined in claim 1, wherein the three panels of said first half-hexahedron are opaque.

3. The educational device as defined in claim 2, wherein said hexahedron is a cube.

4. The educational device as defined in claim 1, wherein said rectangular elements of said grid markings are squares.

5. The educational device as defined in claim 1, wherein the three panels of said first half-hexahedron form a rigid, one-piece unitary structure.

6. The educational device as defined in claim 1, wherein the three panels of said second half-hexahedron form a rigid, one-piece unitary structure.

7. The educational device as defined in claim 1, further comprising (d) first releasable means for disassemblably connecting the three panels of said first half-hexahedron to one another, whereby the three panels of said first half-hexahedron are separable from one another; and (e) second releasable means for disassemblably connecting the three panels of said second half-hexahedron to one another and to said first half-hexahedron, whereby the three panels of said second half-hexahedron are separable from one another and from said first half-hexahedron.

8. The educational device as defined in claim 7, wherein said first releasable means comprises channel means provided in said bottom panel for receiving edge zones of said first and said second vertical panels.

9. The educational device as defined in claim 8, further comprising a spring attached to said bottom panel and urging said first vertical panel against a vertical edge of said second vertical panel when said first and said second vertical panels are received in said channel means.

10. The educational device as defined in claim 7, wherein said second releasable means comprises interfitting cutouts and projections provided on said transparent panels.

11. The educational device as defined in claim 10, wherein said second releasable means further comprises a separate groove provided in an edge portion of said first and second vertical panels for receiving edge portions of said third and fourth vertical panels, respectively.

* * * * *